3 Sheets—Sheet 1.

G. W. COPELAND, E. WOODWARD & M. BROCK.

Assignors, by mense assignments, to the COPELAND LASTING MACHINE Co.

Lasting Machine for Boots and Shoes.

No. 8,138. Reissued March 26, 1878.

WITNESSES

George F. Walker

A. J. Oettinger

INVENTORS.

Geo. W. Copeland.

Erastus Woodward.

Matthew Brock.

by their Attys.

Clarke & Raymond

G. W. COPELAND, E. WOODWARD & M. BROCK.

Assignors, by mense assignments, to the COPELAND LASTING MACHINE CO.

Lasting Machine for Boots and Shoes.

No. 8,138. Reissued March 26, 1878.

WITNESSES
George F. Walker
A. J. Oettinger.

INVENTOR
Geo. W. Copeland.
Everline Woodward.
Matthias Brock.
by their attys
Clarke H. Raymond.

3 Sheets—Sheet 3.

G. W. COPELAND, E. WOODWARD & M. BROCK.

Assignors, by mense assignments, to the COPELAND LASTING MACHINE CO.

Lasting Machine for Boots and Shoes.

No. 8,138. Reissued March 26, 1878.

WITNESSES

George F. Walker

A. J. Pettinger.

INVENTORS

Geo. W. Copeland.

Erastus Woodward.

Matthias Brock by their Attys

Clarke & Raymond

UNITED STATES PATENT OFFICE.

GEORGE W. COPELAND, OF MALDEN, AND ERASTUS WOODWARD AND MATTHIAS BROCK, OF BOSTON, MASSACHUSETTS, ASSIGNORS, BY MESNE ASSIGNMENTS, TO THE COPELAND LASTING MACHINE COMPANY.

IMPROVEMENT IN LASTING-MACHINES FOR BOOTS AND SHOES.

Specification forming part of Letters Patent No. 191,937, dated June 12, 1877; Reissue No. 8,138, dated March 26, 1878; application filed March 16, 1878.

*To all whom it may concern:*

Be it known that we, GEORGE W. COPELAND, of Malden, in the county of Middlesex, ERASTUS WOODWARD, of Boston, in the county of Suffolk, and MATTHIAS BROCK, of said Boston, all in the Commonwealth of Massachusetts, have invented certain new and useful Improvements in Machines for Lasting Boots and Shoes, said improvements being improvements and developments of various devices embodied in patents heretofore granted to George W. Copeland.

Figure 1:
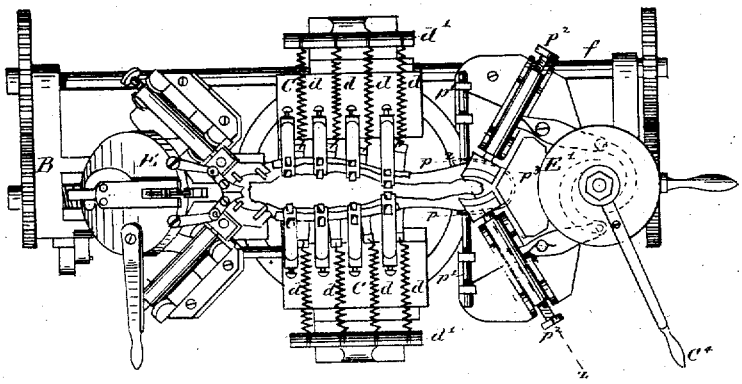
Figure 2:
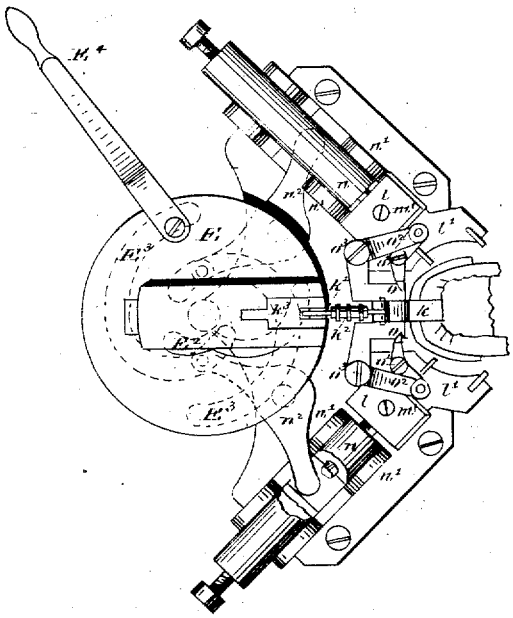
Figure 3:
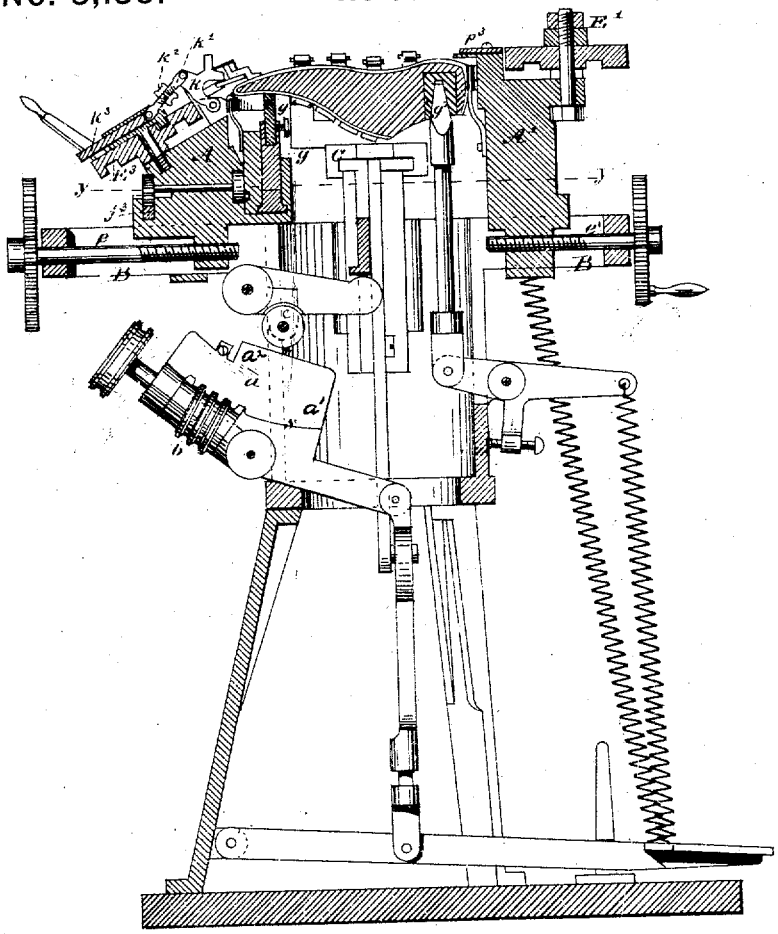
Figure 4:
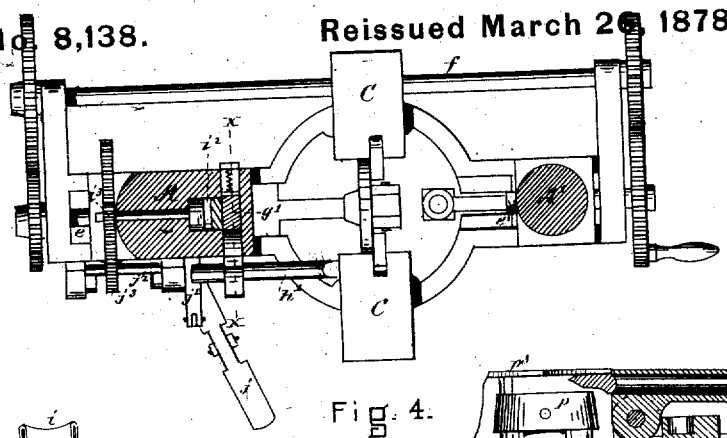
Figure 5:
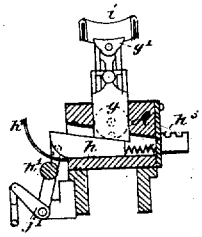
Figure 6:
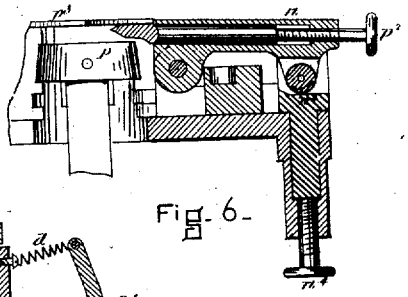
Figure 7:
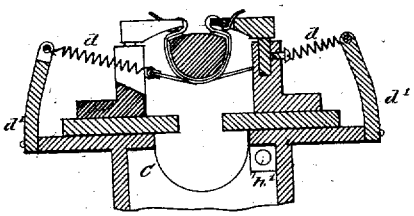
Figure 8:
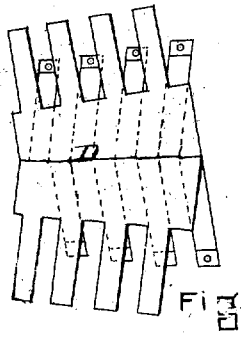
Figure 10:
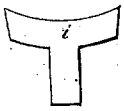
Figure 12:
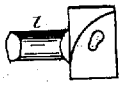
Figure 13:
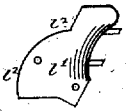
Figure 11:
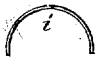
Figure 14:
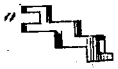
Figure 9:
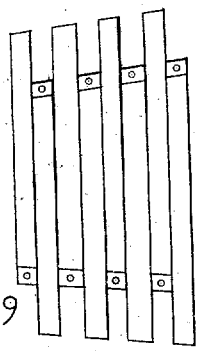

In the drawings, Figure 1 represents a plan of our improved machine; Fig. 3, a vertical section of the same; Fig. 4, a horizontal section upon line *y y*, Fig. 3; Fig. 2, an enlarged plan of toe and heel lasting devices; Fig. 5, a section of Fig. 4 on line *x x*, showing the toe-support and stretching and smoothing pad; Fig. 6, a vertical section of Fig. 1 on line *z z*; Figs. 8 and 9, our improved lasting-girth; Fig. 7, a section, showing the operation of the same; Figs. 10 and 11, details of toe stretching and smoothing pad; Fig. 13, finger-plates; Fig. 12, oscillating bar for the same; and Fig. 14, the wrinkle-sweeping fingers.

This specification for reissue is made for the purpose of erasing the first clause of claim of the original patent, which was for a contrivance invented originally by George W. Copeland, and for which he has applied for a separate patent. Said Copeland was, on March 18, 1878, by our concession, adjudged the prior inventor of the matters set forth in said first claim, upon due proceedings had before the Patent Office, and the claim for the contrivance whereof said Copeland was so adjudged the prior inventor reads as follows: "A girth for lasting the vamp, consisting of two series of unyielding straps, connected or disconnected, rigidly secured at one end to the fingers of the vamp-lasting apparatus, and at the other end to a set of springs or weights on the opposite side of the machine."

The object of our invention is to produce an automatic boot and shoe lasting machine; and it consists of, first, in combination with toe and heel lasting mechanism automatically adjustable with reference to the girth while moving to clamp the boot or shoe, an improved girth for lasting the vamp, consisting of two series of unyielding straps, connected or disconnected, rigidly secured at one end to the adjustable fingers of a vamp-lasting apparatus, and at the other end secured to a set of springs or weights at the opposite sides of the same, to perform essentially the same functions as would be performed by a person's interlaced fingers if endeavoring to form the vamp to the upper part around the edges of the last over upon the insole, with suitable operative mechanism; second, an improved heel-lasting device, consisting of substantially an elastic heel-pad embracing and forming the quarters, and a pair of oscillating finger-plates for turning and smoothing the upper over the edges of the last, as will be hereinafter more fully described; third, improved automatically-adjusting friction toe stretching and smoothing pad, embodying a spring-pad capable of vertical and yielding motion against the toe, operating usually after the girth has performed its functions, the pad reaching nearly to the girth; fourth, improved toe-lasting mechanism, being a combination of wrinkle-sweeping fingers with each of a pair of oscillating, turning, and smoothing finger-plates, as will be more fully described; fifth, an improved method of adjusting heel and toe clamping and lasting mechanism, whereby they assume automatically the most advantageous positions with reference to the girth for the various sizes, as will be hereinafter shown and described; sixth, an improved adjustment for regulating the vertical rise of the girth-fingers, consisting of the adjustable cam on the secondary lever of the train actuating the finger-carrying cross-head; seventh, improved automatic heel and toe supports, consisting of a post resting upon a cam, the cam being preferably actuated by the upward rise of the cross-head; eighth, certain means whereby the last is adjusted upon the heel-support with reference to the toe-lasting mechanism.

The frame, cross-head, and adjustable lasting-fingers having been fully described in the preceding patents, no mention of them is necessary.

The improved adjustment for regulating the vertical rise of the girth-carrying cross-head C is clearly shown by Fig. 3; and it consists of the cam *a* operated by the adjusting-screw *b* moving upon the curved part of the secondary lever of the series, and the roll *c* attached to the third lever of the series, the face of the roll *c* impinging upon the face of the cam *a*, the vertical face $a^1$ of the cam *a* giving the desired height to the cross-head C, and the horizontal face $a^2$ the rest necessary for the girth-carrying fingers to move over the last and inner sole, the rise of the cross-head C being increased, if wished, by moving the cam *a* upon the curved line toward the center of the machine. To the vertical adjustable girth-carrying fingers upon the cross-head C is rigidly attached one end of our improved lasting-girth D, comprised of inelastic material, (shown by Figs. 7, 8, and 9,) the other end of the girth being attached to the springs *d*, of proper strength, made fast to the stands *d'*, Figs. 1 and 7.

It will be clearly seen that when the cross-head is raised (with a last and upper properly secured by the heel and toe clamps) one portion of the girth must be drawn past the other, producing upon the upper a drawing-pressure, commencing at the center or median line of the shoe, and continuing therefrom up and around the edge and over the inner sole with a constantly-increasing intensity, thus removing all wrinkles, and causing the upper to closely conform to the shape of the last at that part subject to the action of the girth.

Upon the projecting tables B B of the body of the machine move the heel and toe clamping and lasting mechanisms.

In practice, it has been found desirable that the rear straps of the girth should embrace the last at the narrowest part of the shank, a distance of about two-fifths of its length from the heel; and, in order to cause the heel and toe clamping and lasting mechanism to move to and from each other in this ratio, we have adopted the plan of so gearing the two parts together that the toe clamping and lasting apparatus will move about three-fifths while the heel mechanism moves about two-fifths of any desired length, the same girth thus answering for several sizes.

It will be seen that the operation of clamping the last automatically adjusts it in position, whatever its length.

The device chosen is plainly shown by Figs. 1, 3, and 4, and consists of right and left screws *e e'*, connected by the shaft *f* with gears of such size that the toe mechanism will move about three in the same time that the heel mechanism moves about two; or the same result can be accomplished by various means, as by using simply a right and left screw of proper pitch.

Our improved automatic heel and toe supports are shown in Figs. 3, 4, and 5; and they consist of a post, *g*, with the toe-rest or heel-spindle $g^1$ $g^2$ secured by a set-screw, so that, if wished, the height can be adjusted for extreme variations. The post *g* rests upon the wedge or cam *h*, actuated by the arm $h^1$.

Attached to the cross-head C, between the wedge or cam *h* and the arm $h^1$, there is interposed the spring $h^2$, for the purpose of allowing the cross-head C to continue its upward motion after the wedge or cam *h* has caused post *g* and its attachment $g^1$ $g^2$ to take a solid and immovable bearing upon the last.

To cause the wedge or cam to return to its normal position at the dropping of the cross-head C, a small spiral spring, $h^3$, is used.

It is obvious that upon the moving upward of the cross-head C, the last held before by the heel and toe clamping mechanism is firmly secured from dropping before the girth-carrying fingers commence to move over the edge of the last to form the upper down upon the inner sole.

Attached to the carriage A, carrying the toe lasting and clamping mechanism, and close to the toe-support, operates the improved automatically-adjusting friction toe stretching and smoothing pad *i*, Figs. 2, 3, 4, 10, and 11, consisting of a spring formed from a T-shaped piece of proper elasticity, the cross of the T being formed to embrace the smallest toe of the series to be operated upon, and of such length as to extend about to the front girth-strap, the curved part of the T being covered with any suitable material to produce friction upon the upper.

The time of operation of the pad *i* is after that of the girth D, the pad then moving up any desired distance, drawing and smoothing the upper around the edges of the last, the post of the T allowing sufficient yield to prevent abrasion of the material operated upon. The desired movement is communicated to the pad *i* in the present instance by means of the treadle *j*, connected to the arm $j^1$, moving the combined lever and slide $j^2$, which moves the rack $j^3$, which is connected to and moves with the adjustable toe mechanism. The rack $j^3$ causes the gear $i^3$ to revolve the proper distance, which, in turn, gives motion to the crank $i^2$, connected to the part $i^1$, carrying the friction toe stretching and smoothing pad *i*.

Next attached to the carriage A of the toe-lasting mechanism is the adjustable and automatic toe-clamp *k*, Figs. 1, 2, and 3. This adjustment is for the purpose of permitting shoes having different pitch at the tread of the toe to be clamped, so that the finger-plates may be made to conform to the same.

The adjustment of the clamp is accomplished by increasing or diminishing the length of the extensible connection by the right and left nut $k^2$. The connection $k^2$ is moved backward at the proper time by the slide $k^3$, driven by the cam-path $E^2$ of the cam E, that actuates the finger-plates. The object of this clamp $k$, applicable equally to either toe or heel, is to allow the wrinkle-sweeping fingers to commence at the center of the toe or heel to perform their functions without obstruction.

The toe-lasting mechanism attached to the carriage A (shown by Figs. 1, 2, 3, 6, 13, and 14) consist of, first, a pair of oscillating plates, $l$ $l$, Fig. 12, with round shanks, carrying at their outer extremities the adjustable finger-plates $l^1$ $l^1$, Fig. 13. These finger-plates $l^1$ $l^1$ are adjustable on the arc $l^2$, having for a center the point of revolution of the wrinkle-sweeping fingers $o$ $o$, Fig. 14, and fastened in position by the set-screws $m^1$ $m^1$. These oscillating plates are carried in the barrels $n$, in which they may turn, attached to the small carriages $n^1$ $n^1$, moved by the levers $n^2$ $n^2$, that in turn receive motion from the cam-paths $E^1$ and lever $E^4$, the paths of the cam E, that engage with the rolls at the farther end of the levers $n^2$, being of any convenient shape to give the proper motion to the finger-plates $l^1$ $l^1$ to enable them to accomplish their purpose of smoothing the upper and causing the wrinkles to assume certain desired positions found advantageous before nailing.

The downward pressure required is produced by the small roll at the back ends of the barrels $n$ $n$, running (during the forward motion of the finger-plates) up the inclines $n^3$ $n^3$, and adjusted to the proper intensity by the thumb-screws $n^4$ $n^4$, placed under the carrier of the inclines $n^3$ $n^3$, as shown in Fig. 6.

The object of constructing the finger-plates so as to allow them to oscillate is to cause them automatically to conform to the contour of the tread of the inner sole when it is pressed to close the last.

The wrinkle-sweeping fingers $o$ $o$, Figs. 1, 2, 3, and 14, are pivoted to the finger-plates $l^1$ $l^1$ by and move around the screw-pins $o^1$ $o^1$, motion being communicated to them by connection with the carriage A by the links $o^2$ $o^2$ swung on the screw-pins $o^3$ $o^3$, the object of these fingers $o$ $o$ being to force the wrinkles or projections left by the clamping device $k$ back from the end of the shoe operated upon.

These wrinkle-sweeping fingers, it is evident, can be used at the heel as well as at the toe, if found desirable.

The heel-lasting apparatus is substantially the same as that for the toe, the toe stretching and smoothing pad $i$ being replaced by the stationary elastic heel-pad $p$, Figs. 1, 3, and 6, re-enforced at the extreme points by the spring-rods $p^1$ $p^1$, that causes the spring-pad $p$ to firmly embrace the quarters during the operation of the finger-plates while turning and pressing the upper over the inner sole, the function of the elastic heel-pad $p$ being to prevent the quarters buckling away from the last by stress applied above.

The finger-plates of the heel-lasting mechanism, in the present instance, are adjustable to various sizes and shapes of shoes by the thumb-screws $p^2$ $p^2$.

In practice it has been found necessary to adjust that part of the toe of the last operated upon by the toe lasting and clamping mechanism to a line horizontal to the vertical axis of the machine; and to secure this result it is necessary that the socket for the heel-supporting spindle $g^2$ should be fitted square with the horizontal line across the toe of the last before alluded to. To bring the last into line with the heel and toe mechanisms, and also be sure of firm support beneath, the hole is preferably made a tapered square, two sides of the square being in the line desired, and the heel-supporting spindle $g^2$ being made to conform thereto. If the hole be round and tapering, the last, properly bored, will come into position for the horizontal line across the toe, before mentioned.

The operation of our improved lasting-machine, with the various parts properly assembled and adjusted, is as follows: The last, prepared as hereinbefore set forth, with the upper secured in the usual manner, is dropped upon the heel-supporting spindle $g^2$. The carriages carrying the heel and toe clamping and lasting mechanisms are then moved so as to clamp the last firmly at the ends and on the sole, and, of course, from the preceding description of the various parts of the machine, it must come automatically in the lines desired with the heel and toe mechanisms. Next, the girth-carrying cross-head is moved upward, causing, at the first part of its ascent, the heel and toe supports $g^1$ $g^2$ to move up and firmly secure the last from dropping by stress applied above. The cross-head, still continuing its motion, draws the girth from the center or median line up around and finally over the inner sole. Then the fingers move down and press the upper firm and close to the inner sole. Partial motion is then given to the toe-lasting mechanism, the result being to remove the automatic toe-clamp and cause the finger-plates to move nearly to the upper. The improved toe stretching and smoothing pad is then raised the proper distance necessary to enable it to stretch and smooth that part of the toe unacted upon by the girth. Motion is again applied to the toe-lasting mechanism, and the finger-plates move forward and over the edges of the last, their motion causing, as hereinbefore described, the wrinkle-sweeping fingers to move from the center of the toe outward, carrying before them any superfluous material; and by the time the finger-plates have arrived at the end of their forward motion the wrinkles have assumed the only positions that the form of the fingers will allow, and the upper at the toe has been pressed firmly to the last and inner sole.

The same description, taken in connection with the body of this specification, will answer for the heel-lasting mechanism. After the upper is formed as required it is secured to the inner sole by any suitable means, and the machine returned to its normal position of rest.

After all the shoes required of one shape and style are finished, if the spring of the tread of the last at the toe for the next lot should increase, shortening the connection $k^1$ of the toe-clamp $k$ and dropping the thumb-screws $n^2$ $n^2$ the proper distances will give the required adjustment, so that the finger-plates will move over the upper without disturbing the inner sole or causing injury to the material operated upon. To assist in securing this result it has been found convenient to bevel sufficiently the edges of all parts that move over the inner sole.

The advantages of our improved machine, and the various automatic motions herein described, are many and important. The girth fulfills the functions required of it in a superior manner. Its parts are inexpensive and of great durability, and if any one of them should be injured or become otherwise unfit for use from any cause it can be readily replaced and adjusted without skilled attendance. No care is required to adjust or secure the last firmly in position, whatever its size, and, no matter what its shape, the machine can be made ready to receive it in a few minutes. The heel and toe clamping mechanisms automatically avoid interference with all other moving parts.

The wrinkle-sweeping fingers cause that part of the toe of the boot or shoe most exposed to view in wear to be the most perfect, and the finger-plates, with their various adjustments, govern perfectly the intensity with which the upper is pressed upon the inner sole and control the position of the wrinkles, as hereinbefore described.

From the description given of the operation of our improved machine, it will be plainly seen that to apply power to operate the parts now moved by hand or foot will not require further invention, but only the ordinary skill of a proper artisan.

Having thus fully described our invention, we claim and desire to secure by Letters Patent—

1. In a lasting-machine, the combination of a girth composed of unyielding straps rigidly secured at one end to the pivoted and adjustable fingers of a vamp-lasting apparatus, and at the other end to a set of springs or weights, with toe and heel lasting mechanism, automatically adjustable with reference to the girth while moving to clamp the boot or shoe, substantially as and for the purposes described.

2. In combination with an elastic heel-pad, embracing and supporting the quarters of the shoe, and with reciprocating folding-plates, the spring-rods $p^1$ $p^1$, all arranged and operated substantially as described.

3. A spring toe stretching and smoothing pad having a vertical motion, and also adapted to move against the upper at the toe, in combination with suitable devices for folding the upper over upon the sole, substantially as shown and described.

4. For toe-lasting devices, the combination of wrinkle-sweeping fingers with oscillating turning and smoothing finger-plates moving in unison therewith, substantially as described.

5. In a lasting-machine, the right and left screws, as shown, in combination with gears operating to bring the shoe, without regard to its size, into the proper position with reference to the girth, for the purpose and operating substantially as described.

6. The automatically-acting heel and toe supports, consisting of a post resting upon a cam or wedge, the cam or wedge being actuated at the commencement of the upward rise of the girth-carrying cross-head, substantially as and for the purposes described.

7. The tapering square spindle, in combination with a last mortised or bored for the reception of the spindle at right angles with a line across the tread of the toe portion of the last, for the purposes shown and described.

8. The combination of the cam $a$, adjusting-screw $b$, and arc $s$ with the secondary lever of the train actuating the girth-carrying cross-head, substantially as and for the purposes described.

9. In combination, the vibrating toe-rest, post, and set-screw, substantially as described.

10. The vibrating or oscillating toe-rest, in combination with the toe-lasting mechanism, substantially as shown and described.

11. The combination, with reciprocating toe-lasting plates, of a reciprocating toe-clamp arranged to operate between such plates, acting alternately, substantially as shown, and for the purposes described.

12. The automatically-removable toe-clamp, forming an abutment for the toe of the boot or shoe to rest against when adjusted in place, and also serving as a clamp to prevent the boot or shoe from rising when acted upon by the girth, substantially as shown and described.

13. In combination with the cam or other actuating mechanism, the folding plates provided with an oscillating or rocking motion, for the purposes substantially as set forth.

14. In a lasting-machine, oscillating plates for lasting the heel or toe, provided with fingers controlling the position of the wrinkles or folds, substantially as described.

15. In a lasting-machine, oscillating finger-plates provided with fingers for sweeping the wrinkles or folds into the desired position, substantially as and for the purposes described.

16. The combination, with oscillating finger-plates, of the reciprocating toe-clamping device, substantially as shown and described.

17. In a lasting-machine, the combination of the arm $h^1$, the spring $h^2$, wedge or cam $h$, spring $h^3$, post $g$, and oscillating toe-support $g^1$.

18. In a lasting-machine, the combination of the lever $j$, arm $j^1$, combined arm and slide $j^2$, rack $j^3$, gear $i^3$, crank $i^2$, and toe stretching and smoothing pad $i$.

19. In a lasting-machine, the combination of the right and left screw *e e* and shaft *f*, suitably geared to produce motions of the heel and toe lasting mechanism, substantially as and for the purposes described.

20. In a lasting-machine, the combination of the toe-clamp *k*, connection $k^1$, nut $k^2$, slide $k^3$, and cam-path $E^2$.

21. In a lasting-machine, the combination of the finger-plates $l^1$, oscillating plates *l*, barrels *n*, carriages $n^1$, levers $n^2$, and cam-paths $E^3$.

GEO. W. COPELAND.
ERASTUS WOODWARD.
MATTHIAS BROCK.

Witnesses:
F. F. RAYMOND, 2d,
GEORGE F. WALKER.